Dec. 12, 1950 R. A. BARNES 2,533,417
ARTICULATED POWER OPERATED HAYRAKE
Filed Nov. 29, 1946 2 Sheets-Sheet 2
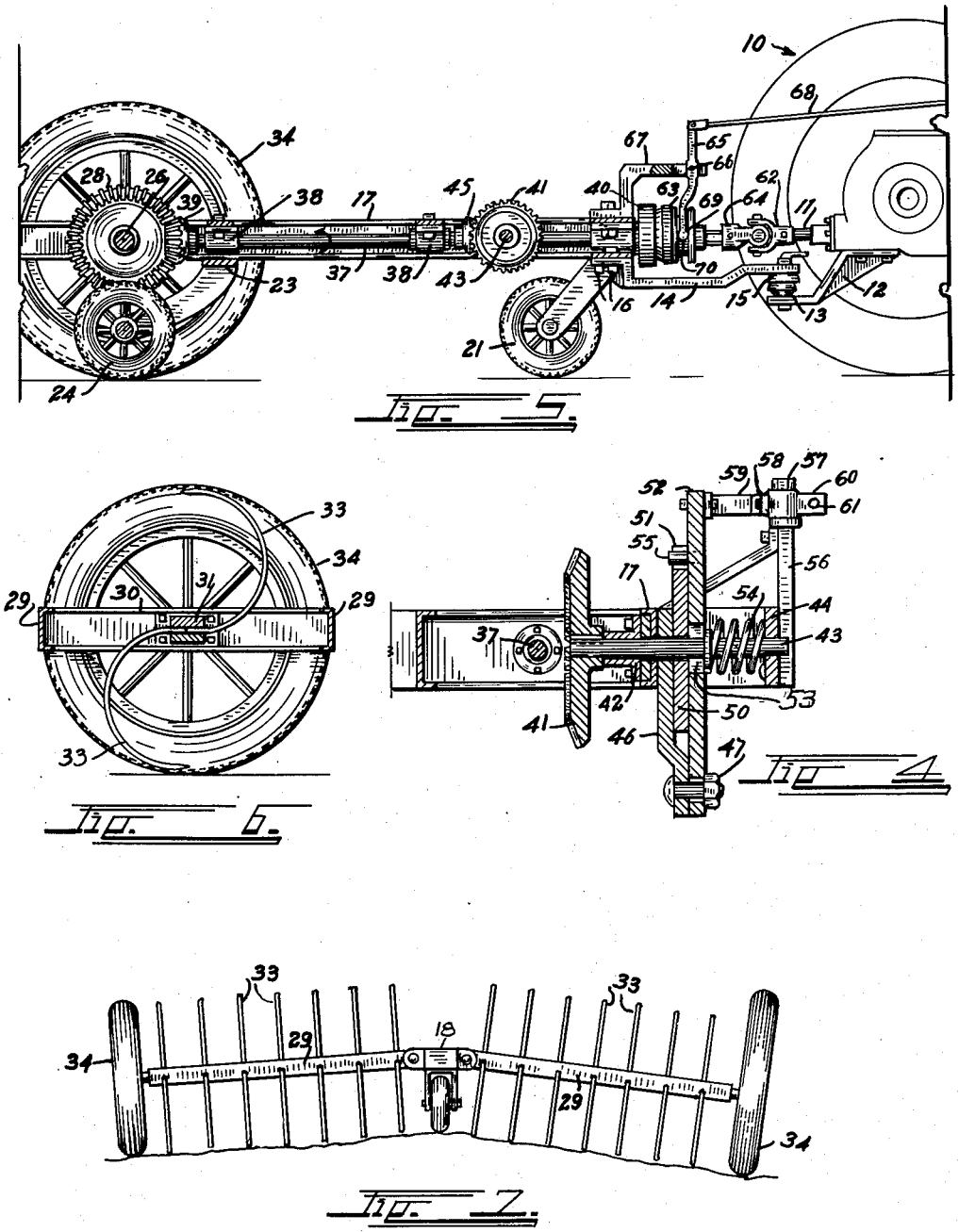
INVENTOR.
ROBERT A. BARNES.
BY Martin E Andrews
ATTORNEY.

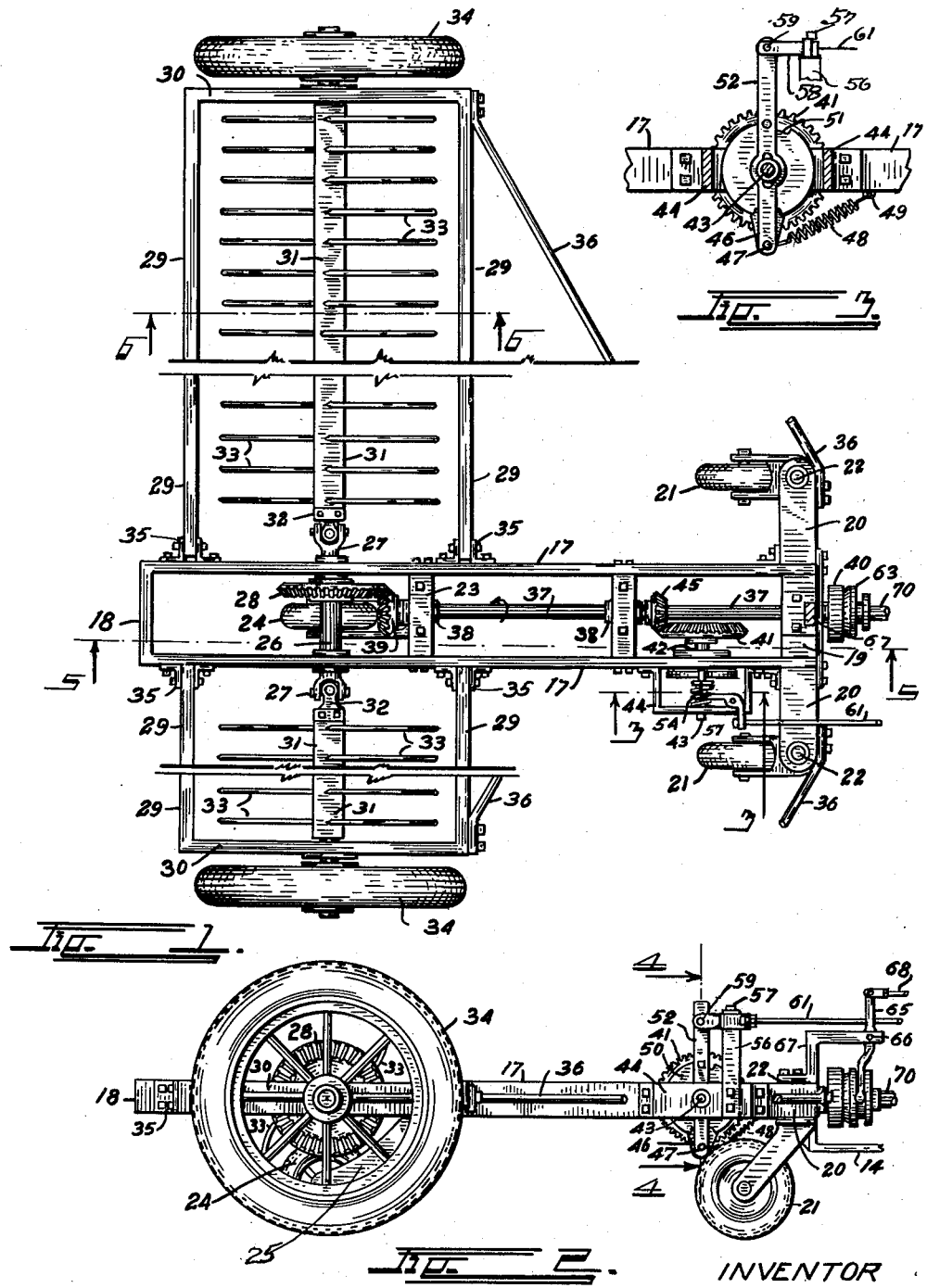

Patented Dec. 12, 1950

2,533,417

UNITED STATES PATENT OFFICE 2,533,417

ARTICULATED POWER-OPERATED HAY RAKE

Robert A. Barnes, Spicer, Colo.

Application November 29, 1946, Serial No. 712,755

9 Claims. (Cl. 56—27)

This invention relates to improvements in articulated power operated hay rakes.

In parts of our country where hay is one of the main crops, or where large acreages of hay are grown, the harvesting is accomplished principally by means of power operated machines. For example, the hay is first cut by means of mowers operated by gasoline tractors, after which the raking and stacking are carried out by means of other machines operated by tractor power.

It is customary where large fields of hay are to be harvested, to rake the hay into windrows by means of rakes drawn by ordinary tractors. In those parts of the country where cattle raising is prevalent, the hay for winter feed is cut to a great extent on fields bearing the grass natural to that part of the country; in other words, such fields may never have been plowed or cultivated, and therefore the surface is usually quite undulating. Since the fields on which this hay is grown are large, containing often up to many hundred acres, it is customary to employ rakes of considerable width. When such rakes are of the ordinary construction, comprising a rake frame supported at its ends by wheels and having the ordinary type rake tines, it frequently happens that when the rake is drawn over rough grounds, the tines will sink into the high spots, often breaking or bending them.

It is an object of this invention to produce a rake that shall be made in at least two sections that are interconnected by means of hinges so as to conform more readily to the unequal surface over which the rake is drawn.

Another object of the invention is to produce a rake in which the tines are of S-shape and which are therefore mounted on a shaft that is intermittently rotated so as to bring opposite ends of the rake tines alternately into engagement with the ground.

Another object of the invention is to produce a rake of the construction indicated in which the turning of the rake tines is effected by means of power derived from the tractor.

Another object of the invention is to produce a rake that can be readily operated by means of the driver of the tractor and which requires only a small amount of effort on his part to effect a release of the rake frame and the rotation of the rake tines through 180 degrees.

A still further further object is to provide a construction in which the complete rotation of the rake teeth, through 180 degrees is effected by means of power derived from the tractor connected with the rake mechanism by means of a clutch.

A still further object of this invention is to produce a rake of the class described in which the two center sections are separated by means of an elongated rectangular frame carrying a system of gears, shafts, detents and release mechanisms for controlling the operation of the rake.

The above and other objects that may become apparent as this description proceeds are attained by means of a construction and an arrangement of parts that will now be described in detail, and for this purpose reference will be had to the accompanying drawing in which the invention has been illustrated, and in which:

Figure 1 is a top plan view of the improved rake, portions thereof having been broken away so as to reduce the size of the drawing;

Figure 2 is an end view looking upwardly in Figure 1;

Figure 3 is a section taken on line 3—3, Figure 1;

Figure 4 is a vertical section taken on line 4—4, Figure 2;

Figure 5 is an end elevation similar to that shown in Figure 2, but showing, in addition, the manner in which the rake is hitched to a tractor;

Figure 6 is a section taken on line 6—6, Figure 1, and shows the shape of the rake tines employed in this construction; and Figure 7 is an end view of the rake showing the same in position on an uneven ground surface to illustrate the manner in which it conforms thereto.

In the drawing reference numeral 10 designates the rear or driving wheel of an ordinary farm tractor and the power take-off shaft has been designated by reference numeral 11. The seat and the control levers have not been shown because they are those ordinarily employed for that purpose and form no part of this invention. Connected with the rear end of the tractor by means of a universal connection comprising, in the specific embodiment illustrated, a bracket 12 that is rigidly connected with the tractor and which is provided at its rear end with a ball or a spherical enlargement 13. A bar 14 having a socket 15 into which the ball 13 fits is connected with the rake by means of bolts 16 in a manner which will hereinafter be more clearly described.

The construction of the rake will now be described and for this purpose reference will be had more particularly to Figures 1 and 2. The rake consists of an elongated substantially rectangular frame having side members 17, connected at their rear by means of a cross member 18 and at the front by means of another cross member 19. The side bar 17 may of any suitable size and although they have been shown as constructed from flat steel bars, it is to be understood that any other structural shapes may be employed, for example, channel iron or angle irons.

Extending transversely of the front end of the rectangular frame are laterally projecting beams 20 which may be built up from suitable structural iron or formed in any other suitable manner. Opposite ends of the transverse beam 20 are provided with caster wheels 21 that rotate about vertical pivots 22. At a point adjacent the rear end, a transverse bar 23 is positioned and rigidly secured to the side members. A caster wheel 24 is connected with the under side of member 23 by means of a wheel fork 25 that is rearwardly curved as shown in Figure 2. A short shaft 26 is journaled in bearings in the side member 17 and terminates in universal coupling elements 27. A bevel gear 28 is secured to shaft 26 by means which prevents relative rotary and longitudinal movement. Extending outwardly from the opposite sides of the center frame are rectangular frames having side members 29 and end members 30. A bar 31 extends laterally from each of the universal elements 27 and is connected with the latter by means of another universal element 32, so as to form a universal joint at this place. A plurality of S-shaped tines 33, like those illustrated in Figure 6, are positioned at spaced intervals along bars 31. The outer ends of the laterally extending frames are supported on wheels 34 which have been shown as provided with rubber tires. The inner ends of side members 29 are pivotally secured to the adjacent side members 17 by means of brackets 35 and the outer ends of these frames are connected with the transverse frame members 20 by means of diagonal braces 36.

A shaft 37 is mounted for rotation in bearings 38 carried by the elongated frame. The rear end of shaft 37 has a pinion 39 that is in mesh with bevel gear 28. The other end of shaft 37 terminates in a friction clutch element 40. A bevel gear 41 is mounted to rotate in a bearing 42 carried by the side member at the bottom in Figure 1. Bevel gear 41 is mounted on shaft 43 that extends outwardly some distance as shown in Figure 1. The outer end of shaft 43 is mounted for rotation in a bearing in the rectangular frame whose outer side wall has been designated by reference numeral 44. A pinion 45 is carried by shaft 37 and is in mesh with bevel gear 41. A plate 46 has its upper end provided with an opening through which the shaft 43 extends and carries a pivot pin 47 at its lower end as shown more clearly in Figures 3 and 4.

A coil spring 48 connects the lower end of plate 46 with an anchor 49 on side member 17. A round disk 50 is nonrotatably connected with shaft 43 and rests substantially against the outer surface of plate 46. Disk 50 is provided with oppositely positioned notches 51 for a purpose which will presently appear. A detent lever 52 has its lower end loosely connected with the pivot 47 so that it may swing to the right in Figure 4 and is provided intermediate its ends with a slightly elongated opening 53 through which shaft 43 extends. A spring 54 surrounds the shaft between the outer surface of lever 52 and the inner surface of bar 44 and exerts an inwardly acting pressure on the lever. Lever 52 is provided with an inwardly extending pin 55 that is so positioned that it will drop into the notches 51 and serve as a stop or detent for limiting the rotation of disk 50. Whatever force is exerted on the pin 55 by disk 50 is resisted by spring 48, which provides a resilient stop for a purpose and in a manner which will hereinafter appear.

Secured to the outer surface of member 44 is a bar 56 that terminates in an upwardly extending pivot 57. A bell crank lever is mounted for pivotation on pivot 57 and has arm 58 connected with lever 52 by means of a tension member 59, as shown most clearly in Figures 2 and 4. The outwardly extending arm 60 of the bell crank lever has connected therewith a tension element 61 that extends forwardly into a position adjacent that of the operator. The forward end may be connected directly with the tractor or to some lever and whenever tension is exerted on member 61 the bell crank lever will turn slightly about its pivot, thereby moving the detent lever 52 outwardly against the action of spring 54 so as to release disk 50 to permit the rake to turn. Before the rake is released, the tines that are in operative engagement with the ground surface and which present their concave sides in the direction of movement are filled with hay. The resistance offered by the hay has a tendency to rotate the rake head in a clockwise direction when viewed as in Figure 6, but this rotary force prevails only through a short angle and therefore it is necessary to complete the 180 degree rotation by means of power derived from the tractor and the manner of effecting this will now be described.

Referring now more particularly to Figures 1 and 5, it will be seen that shaft 37 terminates in a clutch member 40 and that the rear end of the power take-off shaft 11 is provided with a universal coupling element 62. A short shaft has one end connected with the clutch member 63 and the other with the universal coupling 64. A lever 65 is pivoted at 66 to the front end of a bracket 67. The upper end of lever 65 has attached to it a tension member 68 that terminates adjacent the operator. Clutch member 63 is provided with a grooved collar 69 that is engaged by means of the fingers 70 at the lower end of lever 65. When lever 65 is turned clockwise when viewed as in Figure 5, it forces the two friction clutch members into operative engagement, thereby transmitting rotary motion from shaft 11 to shaft 37. The power thus transmitted is merely sufficient to rotate the rake tines so as to bring the inoperative set into operative position. When the rotation has progressed until this position is attained, the parts will be stopped because detent 55 will be engaged by an end wall of one of the notches 51 as shown in Figures 3 and 4. The clutch is now entirely released and as the rake progresses and another load of hay is accumulated in front of the lower group of rake tines, the operator exerts tension on members 61, thereby releasing the detent and initiating the rotary movement of the rake head. The clutch is now temporarily moved into operative position until the rotation of the rake head has completed its 180 degree movement.

In the drawing the rake has been shown as consisting of two hingedly interconnected sections which may each be at least eight feet in length so that the total swath cleared by the rake will be at least sixteen feet. Since the center frame takes up some space, the width of the swath will be somewhat greater than the combined length of the two rake heads.

Attention is called to the fact that caster wheel 24 is positioned so as to be directly below shaft 26 or at least quite close to a vertical plane passing through this shaft. The reason for this is that if this caster wheel were positioned to the rear of the center frame, it would cause the rake tines to be lifted from the ground when the latter is concave between the wheel and the tractor wheel and would cause the back tines to dig into the ground if the ground is upwardly convex between these two points; whereas, by having the caster wheels positioned as shown, the rake tines will follow the contour of the ground more closely.

Having described the invention what is claimed as new is:

1. A power operated hay rake comprising an elongated center frame, a shaft mounted on the frame for rotation about a transverse axis, a shaft mounted on the frame for rotation on an axis extending lengthwise thereof, means for transmitting rotary motion from the latter shaft to the former, elongated rake frames extending laterally from opposite sides of the center frame, and connected with the sides thereof for rocking movement about longitudinally extending pivots, a caster wheel connected with the center frame for supporting the same, a rake bar extending longitudinally of each rake frame, said bars being rotatably supported at their outer ends by the rake frames, a universal connection between the ends of the transverse shaft and the inner ends of the rake bars, S-shaped tines secured to the rake bars, an escapement mechanism connected with the longitudinally extending shaft for limiting successive rotations of the rake bars to 180 degrees, a tractor having a power take-off shaft, means for connecting the front end of the center frame to the tractor, comprising a universal coupling, a clutch positioned between the front end of the elongated shaft and the power take-off shaft, and means for controlling the escapement and the clutch.

2. In combination with a tractor, a hay rake comprising an elongated center frame, means comprising a universal coupling securing the front end of the center frame to the tractor for universal relative movement, supporting means for the rear end of said frame comprising a caster wheel, a shaft extending longitudinally of said frame, a shaft extending transversely of the frame and mounted for rotation about a horizontal axis, means for transmitting rotation from one shaft to the other, the transverse shaft terminating in universal couplings, an escapement means associated with the shaft assembly, comprising a movable detent for limiting each successive rotation of the transverse shaft to a predetermined angle, an elongated U-shaped rake frame on each side of the center frame, pivotally connected with the latter, a supporting wheel at the outer end of each rake frame, a rake bar extending longitudinally of each rake frame, the inner end of each bar being connected with the corresponding universal coupling, the outer end being journaled on the rake frame, a number of S-shaped rake tines in each bar, the tractor having a power take-off shaft, means for transmitting rotation from the power take-off shaft to the longitudinal shaft, comprising a clutch mechanism, means for controlling the operation of the clutch, and means for controlling the position of the detent.

3. In combination with a tractor having a rearwardly extending power take-off shaft, an elongated center frame having its front end connected with the tractor for universal movement, means for supporting the rear end of the center frame comprising a caster wheel, an elongated rake frame extending laterally from each side of the center frame, a supporting wheel at the outer end of each rake frame, a transverse shaft journaled in the center frame, the ends of the shaft having each a universal coupling, a rake bar in each rake frame, the inner ends of said bars being connected with the adjacent couplings and the outer ends rotatably connected with the rake frame, a plurality of spaced rake tines of S-shape carried by each bar, a bevel gear on the transverse shaft, a shaft extending longitudinally of the center frame, the front end of the shaft projecting beyond the front end of the frame, two bevel pinions on the shaft, in longitudinally spaced relation, the rearmost pinion operatively engaging the bevel gear on the transverse shaft, a second bevel gear mounted on the center frame for rotation about a transverse axis, said last named gear being in operative engagement with the forward pinion, an escapement mechanism connected with the forward bevel gear forming means for limiting the rotation of the rake bars to 180 degrees at each successive rotation, means for transmitting rotary movement from the power take-off shaft to the longitudinally extending shaft at the center frame comprising a universal coupling and a clutch, and means for controlling the escapement and the clutch to turn the rake bars.

4. In combination with a tractor having a power take-off shaft, an articulated hay rake comprising, an elongated center frame having spaced sides, means connecting the front end of the center frame with the tractor, means comprising a caster wheel for supporting the rear end of the frame, a shaft mounted for rotation in bearings positioned between the sides, the rear end of the shaft having a bevel pinion, a shaft extending transversely of the frame, a bevel gear thereon in operative engagement with the pinion, the ends of the transverse shaft having universal shaft couplings, rake frames extending laterally from opposite sides of the center frame, supporting wheels at the outer ends of the rake frames, the inner ends of the rake frames being hinged at the center frame for movement about longitudinally extending pivots, each rake frame having a rake bar whose inner end is connected with the universal shaft coupling and whose outer end is rotatably connected with the frame, a bevel pinion connected with the first named shaft adjacent the front end of the center frame, a bevel gear in operative engagement with the last named pinion, said gear being mounted for rotation about an axis perpendicular to the center frame, an escapement mechanism connected with the last named bevel gear for limiting the rotation of the rake bars to successive steps of 180 degrees, a plurality of S-shaped rake tines carried by each bar, means comprising a universal shaft coupling and a clutch for transmitting rotation from the take-off shaft to the longitudinal shaft on the center frame, and means for controlling the clutch and the escapement to effect a semi-circular rotation of the rake bars whenever desired.

5. A hay rake comprising a center frame adapted to be drawn by a draft instrumentality, elongated rake frames extending laterally from opposite sides of the center frame, each rake frame including a pair of spaced members pivoted at their inner ends to the center frame for vertical swinging movement about a horizontal axis, frame means extending between the outer ends of each pair of spaced members having journal means thereon, a rake bar disposed between each pair of said spaced members, the inner end of each rake bar being supported for rotation by the center frame, and the outer end by said journal means, each bar having a plurality of rows of tines thereon, means for rotating the bars to bring successive rows of tines to a raking position and locking them thereat, a wheel at the end of each frame for supporting it, a wheel for supporting the center frame, the construction being such that the last named wheel may move along the ground and the two frames may move vertically independently, whereby the ends of the tines may conform to a nonplanar surface of the ground.

6. A hay rake in accordance with claim 5 wherein each rake frame is provided with a diagonal brace extending between one of the spaced members thereof and the center frame.

7. A hay rake in accordance with claim 5 wherein power transmission means is provided between the inner ends of the rake bars and the front end of the center frame, whereby the rake bars may be rotated from a power take-off on the draft instrumentality.

8. A hay rake in accordance with claim 5 wherein the power transmission means includes a lateral shaft journaled on the center frame, universal joints connecting the inner ends of the rake bars to the ends of the lateral shaft, a shaft extending longitudinally of the center frame terminating at the front end thereof, means connecting the rear end of the last named shaft with the lateral shaft, the rotating and locking means for the tines being interposed between the ends of the last named shaft.

9. A device in accordance with claim 5 wherein the rotating and locking means for the tines may be controlled from the draft instrumentality.

ROBERT A. BARNES.

REFERENCES CITED

The following references are of record in the file of this patent:

UNITED STATES PATENTS

| Number | Name | Date |
|---|---|---|
| 9,541 | Nearing | Jan. 25, 1881 |
| 350,207 | McIntire | Oct. 5, 1886 |
| 2,065,169 | Carpenter | Dec. 22, 1936 |
| 2,162,506 | Jones et al. | June 13, 1939 |
| 2,237,280 | Coultas et al. | Apr. 1, 1941 |
| 2,255,288 | Jones et al. | Sept. 9, 1941 |